United States Patent Office 3,121,662
Patented Feb. 18, 1964

3,121,662
(THIONO)-THIOLPHOSPHONIC AND -THIOLPHOS-PHINIC ACID ESTERS AND A PROCESS FOR THEIR PRODUCTION
Gerhard Schrader, Wuppertal-Cronenberg, Germany, assignor to Farbenfabriken Bayer Aktiengesellschaft, Leverkusen, Germany, a corporation of Germany
No Drawing. Filed Mar. 7, 1961, Ser. No. 93,875
Claims priority, application Germany Mar. 9, 1960
9 Claims. (Cl. 167—22)

The present invention relates to and has as its objects certain new and useful insecticidal active phosphorus compounds and a new and economic process for their production. More specifically the new process leads to (thiono)-thiolphosphonic and -thiolphosphinic acid esters. Generally the new compounds of this invention are of the following formula

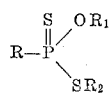

in which R, R₁ and R₂ are lower alkyl radicals up to about 3 carbon atoms.

In accordance with this invention it has been found that (thiono)-thiolphosphonic acid and -phosphinic acid esters may be obtained in a surprisingly simple and easy manner by reacting (thiono)-phosphonic acid and -phosphinic acid monohalides with salts of tri-thiocarbonic acid esters whereby there are not formed, as was to be expected, the mixed anhydrides of phosphonic acid or phosphinic acid and tri-thiocarbonic acid esters, but the (thiono)-thiolphosphonic acid or -phosphinic acid diesters by the elimination of carbon disulfide.

The following reaction equation illustrates the above process

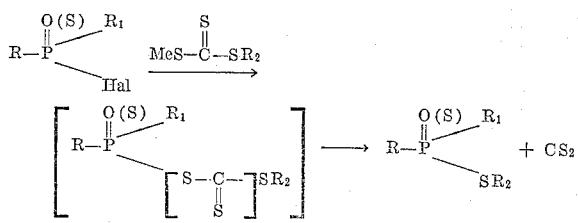

In the above formulae R stands for aliphatic and aromatic radicals, R₁ for the same radicals as R and for alkoxy radicals, and R₂ stands for alkyl, aralkyl and aryl radicals which may be substituted.

Salts of tri-thiocarbonic acid esters in the meaning of this invention are especially alkali metal salts such as sodium and potassium salt and amine salts, especially ammonium salts. In some cases also alkaline earth metal salts may be used.

The (thiono)-phosphonic and phosphinic acid monohalides in the meaning of this invention are especially the chlorides and bromides.

The reaction preferably is carried out in inert solvents or diluents such as lower aliphatic alcohols, benzene, toluene and the like or mixtures thereof. Especially suitable are lower aliphatic ketones such as acetone or methyl ethyl ketone. The reaction temperature largely depends on the reactivity of the starting materials and of the solvent used. Normally the reaction is carried out at slightly elevated temperatures, say above about 20° C. and not much above 100° C.

The new compounds of the present application are pest control agents which may chiefly be used for plant protection. They very effectively kill insects like flies, mites, aphids etc. They distinguish themselves especially by a good contact-insecticidal activity and at the same time by an activity on eating insects such as caterpillars. The compounds may be used in the same manner as other known phosphoric acid insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the ester of the following formula

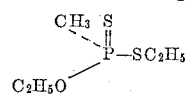

has been tested against spider mites and caterpillars. Aqueous solutions of the aforementioned compound have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The tests have been carried out as follows:

(a) Against spider mites (contact-insecticidal action). Bean plants (Phaseolus vulgaris) of about 15 inches height are sprayed drip wet with solutions as prepared above in a concentration as shown below; the bean plants have been infested heavily with the two-spotted spider (species Tetranychus telarius). Evaluation has been carried out after 24 hours, 48 hours and 8 days. The following results have been obtained: Spider mites were killed completely with 0.01% solutions.

(b) Against caterpillars: white cabbage has been sprayed drip wet with aqueous emulsions as prepared above in the concentration as indicated below. Caterpillars (of the type diamond back moth) (10 each) have been placed on the sprayed leaves of the white cabbage. The living status has been determined after 24 hours and 48 hours. The following results have been obtained: caterpillars are killed completely with 0.1% solutions.

The following examples are given for the purpose of illustrating the present invention:

Example 1

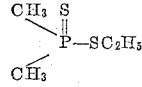

44 grams (0.25 mol) of trithiocarbonic acid ethyl ester potassium salt

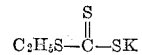

are dissolved in 100 ml. of methyl ethyl ketone. 33 grams of dimethyl-thionophosphinic acid chloride are added at 30–40° C. with stirring. Stirring is continued at 40° C. for a further hour, and the reaction product is then introduced into 300 ml. of water. The separated oil is taken up in 200 ml. of benzene and washed neutral with a 4% bicarbonate solution. The benzene solution is dried with sodium sulfate and the solvent is then evaporated off in a vacuum. The residue obtained solidifies in crystalline form. Upon recrystallization from ligroin, 14 grams of the new ester are obtained in the form of colorless crystals of melting point 86–87° C. Yield: 24% of the theoretical.

Calculated for mol 154: S, 41.5%; P, 20.2%. Found: S, 40.6%; P, 20.7%.

Example 2

$$(CH_3)_2C=CH\underset{C_2H_5O}{\diagup}\overset{O}{\underset{\|}{P}}-SC_2H_5$$

45 grams (0.25 mol) of trithiocarbonic acid ethyl ester potassium salt are dissolved in 100 ml. of methyl ethyl ketone. 46 grams of isobutylene-phosphonic acid-O-ethyl ester are added at 40° C. with stirring. The temperature is maintained at 40° C. for a further hour and the product is worked up as described in Example 1. Thus, 47 grams of the new ester are obtained in the form of a colorless, water-insoluble oil. Yield: 66% of the theoretical.

Calculated for mol 208: S, 15.4%; P, 14.9%. Found: S, 16.0; P, 14.0%.

Aphids are killed to 80% with 0.001% solutions and systemic action with 0.1% solution=100%.

Example 3

$$CH_3\underset{C_2H_5O}{\diagup}\overset{S}{\underset{\|}{P}}-SC_2H_5$$

44 grams (0.25 mol) of trithiocarbonic acid ethyl ester potassium salt are dissolved in 100 ml. of methyl ethyl ketone. 40 grams of methyl-thionophosphonic acid-O-ethyl ester chloride are added at 40° C. with stirring. Stirring is continued at 40° C. for another hour and the product is then worked up as described in Example 1. In this way, 39 grams of the new ester are obtained in the form of a colorless, water-insoluble oil. Yield: 60% of the theoretical.

Calculated for mol 184: S, 34.8%; P, 16.8%. Found: S, 35.0%; P, 16.0%.

By the same way there may be obtained the compounds of the following formulae:

$$C_2H_5\underset{CH_3O}{\diagup}\overset{S}{\underset{\|}{P}}-SC_2H_5$$

$$C_3H_7\underset{C_3H_7O}{\diagup}\overset{S}{\underset{\|}{P}}-S-CH_3$$

$$CH_3\underset{C_2H_5O}{\diagup}\overset{S}{\underset{\|}{P}}-SC_3H_7$$

I claim:

1. A process for the production of a compound of the following formula $$R-\overset{X}{\underset{\|}{P}}\diagdown^{R_1}_{SR_2}$$

wherein $R_1$ is a member selected from the group consisting of lower alkyl having up to 3 carbon atoms and lower alkoxy; $R_2$ is lower alkyl having up to 3 carbon atoms; $R_1$ is a member selected from the group consisting of lower alkyl having up to 3 carbon atoms and isobutylene; and X is a member selected from the group consisting of oxygen and sulfur; which comprises contacting a compound of the formula $$R-\overset{X}{\underset{\|}{P}}\diagdown^{R_1}_{Hal}$$

wherein R, $R_1$ and X have the same meaning as defined above and Hal is a halide with a compound of the formula $$MeS-\overset{S}{\underset{\|}{C}}-SR_2$$

wherein $R_2$ has the same meaning as defined above and Me is a salt forming radical.

2. A process of claim 1 wherein the contacting is carried out in an inert solvent at a temperature up to about 100° C.

3. A process of claim 2 wherein Hal is a member selected from the group consisting of chloro and bromo and Me is a member selected from the group consisting of alkali metals and alkaline earth metals.

4. A process of claim 3 wherein R and $R_1$ are each lower alkyl having up to 3 carbon atoms.

5. A process of claim 3 wherein R is lower alkyl having up to 3 carbon atoms and $R_1$ is lower alkoxy having up to 3 carbon atoms.

6. A compound of the formula $$R-\overset{S}{\underset{\|}{P}}\diagdown^{OR_1}_{SR_2}$$

wherein $R_1$ and $R_2$ are each lower alkyl having up to 3 carbon atoms and R is a member selected from the group consisting of methyl and isobutylene.

7. A compound of claim 6 wherein R is methyl.

8. A compound of claim 6 wherein R is isobutylene.

9. A process for combatting insects which comprises contacting the insects with an effective amount of the compound of the formula $$R-\overset{S}{\underset{\|}{P}}\diagdown^{OR_1}_{SR_2}$$

wherein $R_1$ and $R_2$ are each lower alkyl having up to 3 carbon atoms and R is a member selected from the group consisting of lower alkyl having up to 3 carbon atoms and isobutylene.

References Cited in the file of this patent

UNITED STATES PATENTS

| | | |
|---|---|---|
| 2,392,841 | Detrick et al. | Jan. 15, 1946 |
| 2,967,884 | Dunn et al. | Jan. 10, 1961 |